United States Patent
Barbosa et al.

(10) Patent No.: US 11,189,388 B2
(45) Date of Patent: Nov. 30, 2021

(54) METHODS FOR PURIFYING MOLYBDENUM-99

(71) Applicant: Curium US LLC, St. Louis, MO (US)

(72) Inventors: Luis Antonio M. M. Barbosa, Bergen (NL); Frits Dekker, Callantsooq (NL); Marjolijn Gerritsen, 'T Zand (NL); Mark David Hermeler, Den Helder (NL)

(73) Assignee: Curium US LLC, St. Louis, MO (US)

( * ) Notice: Subject to any disclaimer, the term of this patent is extended or adjusted under 35 U.S.C. 154(b) by 430 days.

(21) Appl. No.: 16/325,863

(22) PCT Filed: Aug. 14, 2017

(86) PCT No.: PCT/US2017/046710
§ 371 (c)(1),
(2) Date: Feb. 15, 2019

(87) PCT Pub. No.: WO2018/035016
PCT Pub. Date: Feb. 22, 2018

(65) Prior Publication Data
US 2019/0198186 A1    Jun. 27, 2019

Related U.S. Application Data

(60) Provisional application No. 62/375,684, filed on Aug. 16, 2016.

(51) Int. Cl.
| | | |
|---|---|---|
| *G21G 1/00* | (2006.01) | |
| *B01D 15/00* | (2006.01) | |
| *C01G 39/00* | (2006.01) | |
| *B01D 15/36* | (2006.01) | |
| *B01D 15/42* | (2006.01) | |

(52) U.S. Cl.
CPC .......... *G21G 1/001* (2013.01); *B01D 15/363* (2013.01); *B01D 15/426* (2013.01); *C01G 39/003* (2013.01); *G21G 2001/0036* (2013.01)

(58) Field of Classification Search
CPC ......... G21G 1/0001; G21G 2001/0036; B01D 15/363
See application file for complete search history.

(56) References Cited

U.S. PATENT DOCUMENTS

| | | |
|---|---|---|
| 5,508,010 A | 4/1996 | Sameh et al. |
| 8,449,850 B2 * | 5/2013 | Glenn .................. G21C 19/46 423/6 |
| 8,872,124 B2 | 10/2014 | Graves et al. |
| 2011/0305308 A1 | 12/2011 | Su |

FOREIGN PATENT DOCUMENTS

WO    2012018752 A1    2/2012

OTHER PUBLICATIONS

PCT International Search Report and Written Opinion, Application No. PCT/US2017/046710, dated Oct. 30, 2017, 14 pps.
K. Dadachova, K. La Riviere, P. Anderson, "Improved Processes of Molybdenum-99 Production", In Hardy, C.J. (Ed.). Second international conference on isotopes Conference proceedings (1997).
Ihsanullah, "Significance and Initial Investigations for the Seperation of Molybdenum from the Anion Exchange Resin Prior to Technitium Analysis by ICP-MS", Journal of Radioanalytical and Nuclear Chemistry, Articles, vol. 191, No. 1 (1995), pp. 67-73.
T.N. van der Walt and P.P. Coetzee, "The isolation of 99Mo from fission material for use in the 99Mo/99mTc generator for medical use", Radiochim Acta 92, 251-257 (2004), Oldenbourg Wissenschaftsverlag, Munchen.
Sameh A. Ali and Hans J. Ache, "Production Techniques of Fission Molybdenum-99", Nuclear Research Center Karlsruhe, Institute of Radiochemistry, Radiochimica Acta 41, 65-72 (1987), Karlsruhe, FRG.

* cited by examiner

*Primary Examiner* — Sikarl A Witherspoon
(74) *Attorney, Agent, or Firm* — Armstrong Teasdale LLP

(57) ABSTRACT

Methods for purifying the molybdenum-99 isotope are disclosed. Molybdenum-99 is loaded onto an anion exchange column and extracted. In some embodiments, the extraction solution may include nitric acid and nitrate salts. In other embodiments, a two stage elution is performed in which a nitric acid containing eluent and a hydroxide containing eluent are used in succession to extract molybdenum-99.

18 Claims, No Drawings

METHODS FOR PURIFYING MOLYBDENUM-99

CROSS-REFERENCE TO RELATED APPLICATIONS

This application is a 35 U.S.C. § 371 national stage of International Application No. PCT/US2017/046710, filed on Aug. 14, 2017, which claims the benefit of U.S. Provisional Patent Application No. 62/375,684 filed Aug. 16, 2016, both of which are incorporated herein by reference in their entirety.

FIELD OF THE DISCLOSURE

The field of the disclosure relates to methods for purifying molybdenum-99. In particular, the field of the disclosure relates to extraction solutions and sequences for removing molybdenum-99 from an anion exchange resin.

BACKGROUND

Technetium-99m (Tc-99m) is a radioisotope commonly used for diagnostic medical purposes. Technetium-99m may be used in in vivo imaging methods as an emitting radiotracer to track the biochemical, molecular, and/or pathophysiological processes in humans and animals. Technetium-99m emits gamma rays which may serve as beacons for identifying the exact location of diseases and pathological processes under study without surgical exploration of the human body. With these non-invasive imaging methods, the diagnosis of diseases may be more comfortable for patients, as opposed to the more traditional and invasive approaches, such as exploratory surgeries.

Technetium-99m (Tc-99m) may be obtained from the radioisotope molybdenum-99 (Mo-99). Tc-99m has a half-life of about 6 hours and decays mostly by gamma emission to the isotope technetium-99 (Tc-99) which has a considerable half-life of about 211,000 years. These properties may Tc-99m an ideal material for medical radiotracing. Thus, the availability of the long-lived parent, Mo-99, having a half-life of about 66 hours, is of significant interest because of its generation of the shorter-lived Tc-99m radioisotope.

Molybdenum-99 may be obtained by fission of a target body containing enriched uranium-235. The irradiated targets are processed by stripping molybdenum-99 from the targets followed by various separation and purification steps.

A need exists for processes for purifying molybdenum-99 that involve increased recovery of molybdenum-99 and that produce less waste.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a method for purifying a molybdenum-99 feed stream that comprises molybdenum-99. The molybdenum-99 feed stream is contacted with anion exchange media to adsorb molybdenum-99 onto the media. The molybdenum-99 adsorbed media is contacted with an eluent solution comprising nitric acid and a nitrate salt.

Another aspect of the present disclosure is directed to a method for purifying a molybdenum-99 feed stream that comprises molybdenum-99. The molybdenum-99 feed stream is contacted with anion exchange media to adsorb molybdenum-99 onto the media. The molybdenum-99 adsorbed media is contacted with a nitric acid-containing eluent solution. The molybdenum-99 adsorbed media is also contacted with a hydroxide-containing eluent solution.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION

Provisions of the present disclosure relate to methods for purifying molybdenum-99. The molybdenum-99 stream is contacted with anion exchange media and extracted from the media with nitric acid and a nitrate. Alternatively, molybdenum-99 may be extracted in a two-step extraction in which a nitric acid eluent and hydroxide eluent are used to recover molybdenum-99 from the anion exchange resin.

The molybdenum-99 solution (which may be referred to herein as the "molybdenum-99 feed stream") which is purified according to embodiments of the present disclosure may be a downstream product of uranium-235 irradiation. The irradiation process produces molybdenum-99 and various other irradiation by-products and contaminants. After stripping molybdenum-99 from the target body and performing various purification processes, a relatively pure molybdenum-99 containing solution that is subjected to the purification process of embodiments of the present disclosure is obtained. The solution contains small amounts of other isotopes such as tungsten-187, ruthenium-103 and ruthenium-106. The molybdenum-99 feed stream may have a purity of about 90 wt % on dry basis (e.g., may contain at least about 90 wt % molybdenum-99 on a dry basis or at least about 95 wt % or even at least about 99% molybdenum-99 on dry basis). Alternatively or in addition, the feed stream may contain molybdenum-99 in an amount suitable to have an activity of at least about 87.3 GBq/mg.

In some embodiments, the molybdenum-99 feed stream that is loaded onto the column is the aqueous alkaline discharge from a previous purification step in molybdenum-99 processing. Molybdenum-99 in the feed stream may be in the form of molybdenyl ions ($^{99}MoO_2^{2+}$). The molybdenum-99 feed stream may include a hydroxide such as sodium or potassium hydroxide (i.e., an aqueous hydroxide solution is the carrying solution). The concentration of hydroxide may be from 0.1 M to about 4 M or from about 0.5 M to about 2 M (e.g., about 1 M). The feed stream loaded onto the column may have a volume of from about 200 ml to about 1500 ml or from about 400 ml to about 1200 ml. The molybdenum-99 feed stream may contain at least about 10 ppm of molybdenum-99 or at least about 25 ppm, at least about 50 ppm or at least about 75 ppm (e.g., from about 10 ppm to about 1000 ppm, from about 10 ppm to about 500 ppm or from about 50 ppm to about 250 ppm of molybdenum-99).

The ion exchange column to which the molybdenum-99 isotope is loaded includes anion exchange media (e.g., anion exchange resin) and may be a strongly basic anion exchange column. Such strongly basic anion exchange columns maintain a positive charge across a wide range of pHs. Exemplary strongly basic anion exchange resins include quaternary ammonium resins. The exchange resin may be hydroxide form and may have a mesh size consistent with metal or metalloid chromatography (e.g., from about 100 to about 200 mesh). Suitable resins may be purchased commercially such as AG1-X4 or AG1-X8 (BIO-RAD (Hercules, Calif.)). Suitable strong basic anion exchange resins may also be purchased from Eichrom (Lisle, Ill.).

After loading, the column and molybdenum-99 adsorbed media is eluted to extract molybdenum-99 from the column. In some embodiments of the present disclosure, the column is contacted with an eluent solution (which may be referred to herein as an "extraction solution") that includes nitric acid ($HNO_3$) and a nitrate salt. Elution may be performed at room temperature (e.g., about 20° C.) or even at temperatures above room temperature (e.g., greater than about 20° C., greater than about 30° C. or in some embodiments within a range of temperatures such as from about 30° C. to about 60° C.).

In some embodiments, the nitrate salt is selected from alkali or alkaline earth-metal nitrate salts. In other embodiments, the nitrate salt is selected from alkali salts such as sodium nitrate and potassium nitrate.

The nitric acid in the eluent solution may be relatively dilute. The concentration of nitric acid in the extraction solution may be less than about 4 M, less than about 3 M, less than 1 M or even less than about 0.5 M (e.g., from about 0.01 M to about 6 M, from about 0.05 M to about 4 M, from about 0.05 M to about 2 M or from about 0.05 M to about 0.5 M).

The concentration of the nitrate in the extraction solution may be at least about 0.01 M or at least about 0.1 M, at least about 0.5 M or at least about 1 M (from about 0.01 M to about 6 M or from about 0.1 M to about 6 M). As the concentration of nitric acid is decreased, the concentration of nitrates may be increased to compensate and vice versa.

The ratio of the mass of eluent solution that includes nitric acid and nitrate salt to the mass of molybdenum-99 loaded onto the column may be less than about 4:1, less than about 2:1, less than about 3:2, less than about 1:1, less than about 1:2 or even less than about 1:3 (e.g., from about 4:1 to about 1:5 or from about 3:2 to about 1:2). For typical commercial scale production, the volume of the eluent solution that includes nitric acid and nitrate salt may be at least about 50 ml, at least about 100 ml, at least about 150 ml or from about 50 ml to about 1 L or from about 100 ml to about 750 ml.

In another embodiment, extraction of molybdenum-99 is performed in a two-step extraction process in which two separate elution solutions are used to remove molybdenum-99. One elution solution is a nitric acid-containing eluent solution and the second is a hydroxide-containing eluent solution. The nitric acid-containing solution may contact the molybdenum-99 adsorbed media before the hydroxide-containing eluent solution or, as in other embodiments, after the hydroxide-containing eluent solution.

It should be noted that embodiments of extraction processes that use nitric acid and hydroxide are generally described herein as two-step extraction processes. However, it should be noted that in some embodiments a one-step extraction process is used in which the nitric acid-containing eluent solution and the hydroxide-containing eluent solution are the same solution.

The concentration of the nitric acid in the nitric acid-containing solution may be at least about 0.5 M or at least about 1 M, at least about 2 M or at least about 3 M (e.g., from about 0.5 M to about 8 M, from about 1 M to about 6 M or from about 3 M to about 5 M).

The ratio of the mass of the nitric acid-containing eluent solution to the mass of molybdenum-99 loaded onto the column may be less than about 4:1, less than about 2:1, less than about 3:2, less than about 1:1, less than about 1:2 or even less than about 1:3 (e.g., from about 4:1 to about 1:5 or from about 3:2 to about 1:2). For typical commercial scale production, the volume of the eluent solution that includes nitric acid may be at least about 25 ml, at least about 50 ml or at least about 100 ml (e.g., from about 50 ml to about 1 L, from about 50 ml to about 500 ml or from about 100 ml to about 300 ml).

The hydroxide in the hydroxide-containing eluent solution may be selected from the group consisting of alkali or alkaline earth-metal hydroxides. In some embodiments, the hydroxide is an alkali hydroxide or is selected from sodium hydroxide and potassium hydroxide. In some embodiments, the concentration of the hydroxide is at least about 0.1 M, at least about 0.5 M, at least about 1 M or less than about 6 M or less than about 5 M (e.g., from about 0.1 M to about 6 M, from about 0.5 M to about 6 M or from about 1 M to about 3 M).

The ratio of the mass of the hydroxide-containing eluent solution to the mass of molybdenum-99 loaded onto the column may be less than about 4:1, less than about 2:1, less than about 3:2, less than about 1:1, less than about 1:2 or even less than about 1:3 (e.g., from about 4:1 to about 1:5 or from about 3:2 to about 1:2). For typical commercial scale production, the volume of hydroxide in hydroxide-containing eluent solution may be at least about 25 ml, at least about 50 ml or at least about 100 ml (e.g., from about 50 ml to about 100 ml, from about 50 ml to about 500 ml or from about 100 ml to about 300 ml).

In embodiments in which both nitric acid and a nitrate salt is used to extract molybdenum-99 from the anion exchange resin and in which successive nitric acid and hydroxide solutions are used, at least about 50% of the molybdenum-99 may be recovered or even at least about 60%, at least about 70%, at least about 80% or even at least about 90% of the molybdenum-99 is recovered (e.g., from about 50% to about 100%, from about 50% to about 95%, from about 70% to about 95% or from about 80% to about 95% of the molybdenum-99 is recovered).

In embodiments in which successive nitric acid and hydroxide solutions are used, each solution may extract at least about 25% of the molybdenum-99 or at least about 30%, at least about 35% or even at least about 40% of the molybdenum-99 on the anion exchange media.

After elution, the extracted molybdenum-99 may be further processed by removing the molybdenum-99 from the solution (e.g., washing, drying and/or sublimation in one or more cycles). The extracted molybdenum-99 may be taken up by a suitable matrix (e.g., resin or solvent solution). In some embodiments, the molybdenum-99 eluate extracted from the column is not further purified (i.e., no further column purification processes or other purification steps are performed prior to molybdenum-99 being taken up in its matrix).

Compared to conventional methods for eluting molybdenum-99 from anion exchange columns, the methods of embodiments of the present disclosure have several advantages. In embodiments in which a mixture of nitric acid and a nitrate salt are used to elute molybdenum-99 from the column, more molybdenum-99 is removed from the column even with less eluent volumes compared to conventional methods in which nitric acid alone is used for elution (see Examples 1 and 2 below). Greater increases in molybdenum-99 yield increases the productivity of the molybdenum-99 production process. Less eluent reduces waste and reduces the amount of solvent that must be separated from the molybdenum-99 product. Use of relatively dilute nitric acid (e.g., less than about 2 M, less than about 1 M or less than about 0.5 M) may prevent the anion exchange material from shrinking. Shrinking causes the exchange media to not properly wet with eluent material which reduces recovery. In embodiments in which both nitric acid and hydroxide are used as eluents in a two-step extraction process, an improvement in molybdenum-99 yield may be observed, even with less eluent volumes compared to use of nitric acid alone.

EXAMPLES

The processes of the present disclosure are further illustrated by the following Examples. These Examples should not be viewed in a limiting sense.

Example 1: Comparison of Molybdenum Elution Yields of Nitric Acid Eluent Vs Eluent Comprising Nitric Acid and Potassium Nitrate Molybdenum in an aqueous NaOH (1 M) loading solution (31 ml with 100 ppm molybdenum) was loaded onto a column containing 1-2 grams of a strong anion exchange resin (AG1-X4; Bio-Rad (Hercules, Calif.)). The column was eluted with 4 M nitric acid (38.5 ml). Another elution run was performed with the eluent being a combination of 0.1 M nitric acid and 4 M potassium nitrate. A third run was performed with the eluent being a combination of 0.1 M $HNO_3$ and 4 M potassium nitrate; however the elution volume was half that of the first run and the second run. The results of the runs are shown in Table 1 below:

TABLE 1

Molybdenum elution with various eluents

| | Eluent | | |
|---|---|---|---|
| | $HNO_3$ (4M) | $HNO_3$ (0.1M) and $KNO_3$ (4M) | Half Volume of $HNO_3$ (0.1M) and $KNO_3$ (4M) |
| Percentage Molybdenum Eluted | 44% | 86% | 79% |

As may be seen from Table 1, use of potassium nitrate greatly increased the amount of molybdenum eluted with nearly twice as much molybdenum being eluted with the $HNO_3$ (0.1 M) and $KNO_3$ (4 M) eluent. Reduction of the elution volume by 50% resulted in sufficient recovery with the half-volume eluent removing about 80% more molybdenum than the eluent containing only $HNO_3$ (4 M). While natural molybdenum was eluted, the results are indicative of the performance with the molybdenum-99 isotope.

Example 2: Comparison of Molybdenum Elution Yields of Nitric Acid Eluent Vs Various Other Eluents Molybdenum (80-100 mg) in an aqueous NaOH (1 M) loading solution (800 ml with about 100 ppm molybdenum) was loaded onto a commercial-scale column (65 ml) containing a strong anion exchange resin (AG1-X4) (55 g). The column was eluted with 500 ml nitric acid (4M). Additional elution runs were performed with the eluent including nitric acid and sodium or potassium nitrate (some at half volume elutions). Another run involved a first extraction with nitric acid (200 ml) followed by a second extraction with sodium hydroxide (200 ml). The results of the runs are shown in Table 2 below:

TABLE 2

Molybdenum elution with various eluents

| | Eluent | | | | |
|---|---|---|---|---|---|
| | $HNO_3$ (4M) | $HNO_3$ (0.1M) and $NaNO_3$ (4M) | $HNO_3$ (0.1M) and $KNO_3$ (4M) | $HNO_3$ (0.1M) and $NaNO_3$ (2M) | $HNO_3$ (4M) and NaOH (2M) |
| Elution Volume (ml) | 500 | 250 | 500 | 250 | 400 |
| Percentage Molybdenum Eluted | 68% | 95% | 91% | 99.5% | 47% for $HNO_3$; 43% NaOH (90% total) |

As shown in Table 2, use of sodium or potassium nitrate resulted in a 33% or more increase in the amount of molybdenum that was extracted relative to nitric acid alone. The 2M potassium nitrate solution was as effective in removing molybdenum as the 4 M potassium nitrate solution suggesting that use of greater than 2 M nitrate may not improve molybdenum yield. Use of $HNO_3$ and NaOH in succession resulted in about a 32% increase in extracted molybdenum relative to nitric acid alone. While natural molybdenum was eluted, the results are indicative of the performance with the molybdenum-99 isotope.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:
1. A method for purifying a molybdenum-99 feed stream comprising molybdenum-99, the method comprising:
contacting the molybdenum-99 feed stream with anion exchange media to adsorb molybdenum-99 onto the media; and contacting the molybdenum-99 adsorbed media with an eluent solution comprising nitric acid and a nitrate salt.

2. The method as set forth in claim 1 wherein the molybdenum-99 feed stream comprises at least about 90 wt % molybdenum-99 on a dry basis.

3. The method as set forth in claim 1 wherein the nitrate salt is selected from the group consisting of alkali or alkaline earth-metal nitrate salts.

4. The method as set forth in claim 1 wherein the nitrate salt is selected from the group consisting of sodium nitrate and potassium nitrate.

5. The method as set forth in claim 1 wherein the molybdenum-99 feed stream comprises molybdenyl-99 ions.

6. The method as set forth in claim 1 wherein the molybdenum-99 feed stream is an aqueous hydroxide solution.

7. The method as set forth in claim 1 wherein the ratio of the mass of the eluent solution to the mass of molybdenum-99 in the molybdenum-99 feed stream is less than about 4:1.

8. A method for purifying a molybdenum-99 feed stream comprising molybdenum-99, the method comprising:
contacting the molybdenum-99 feed stream with anion exchange media to adsorb molybdenum-99 onto the media;
contacting the molybdenum-99 adsorbed media with a nitric acid-containing eluent solution; and
contacting the molybdenum-99 adsorbed media with a hydroxide-containing eluent solution containing hydroxide at a concentration of at least 0.1 M.

9. The method as set forth in claim 8 wherein the molybdenum-99 feed stream comprises at least about 90 wt % molybdenum-99 on a dry basis.

10. The method as set forth in claim 8 wherein the nitric acid-containing eluent comprises a nitrate salt selected from the group consisting of alkali or alkaline earth-metal nitrates.

11. The method as set forth in claim 8 wherein the nitric acid-containing eluent comprises a nitrate salt selected from the group consisting of sodium nitrate and potassium nitrate.

12. The method as set forth in claim 8 wherein the nitric acid-containing eluent solution is separate from the hydroxide-containing eluent solution, the nitic acid-containing eluent solution contacting the molybdenum-99 adsorbed media before the hydroxide-containing eluent solution.

13. The method as set forth in claim 8 wherein the nitric acid-containing eluent solution is separate from the hydroxide-containing eluent solution, the hydroxide-containing eluent solution contacting the molybdenum-99 adsorbed media before the nitic acid-containing eluent solution.

14. method as set forth in claim 8 wherein the molybdenum-99 feed stream comprises molybdenyl-99 ions.

15. The method as set forth in claim 8 wherein the molybdenum-99 feed stream is an aqueous hydroxide solution.

16. The method as set forth in claim 8 wherein the ratio of the mass of the nitric acid-containing eluent solution to the mass of molybdenum-99 in the molybdenum-99 feed stream is less than about 4:1.

17. The method as set forth in claim 8 wherein the ratio of the mass of the hydroxide-containing eluent solution to the mass of molybdenum-99 in the molybdenum-99 feed stream is less than about 4:1.

18. The method as set forth in claim 8 wherein the ratio of the mass of the sum of the nitric acid hydroxide-containing eluent solution and the hydroxide-containing eluent solution to the mass of molybdenum-99 in the molybdenum-99 feed stream is less than about 2:1.

\* \* \* \* \*